April 30, 1968        D. SCARAMUCCI        3,380,707

BALL VALVE

Filed Sept. 16, 1965        2 Sheets-Sheet 1

INVENTOR.
DOMER SCARAMUCCI
BY
Dunlap and Laney
ATTORNEYS

April 30, 1968     D. SCARAMUCCI     3,380,707

BALL VALVE

Filed Sept. 16, 1965     2 Sheets-Sheet 2

INVENTOR.
DOMER SCARAMUCCI

BY
Dunlap and Laney
ATTORNEYS

United States Patent Office 3,380,707
Patented Apr. 30, 1968

3,380,707
BALL VALVE
Domer Scaramucci, Oklahoma City, Okla., assignor to Balon Corporation, Oklahoma City, Okla., a corporation of Oklahoma
Filed Sept. 16, 1965, Ser. No. 487,831
5 Claims. (Cl. 251—148)

ABSTRACT OF THE DISCLOSURE

A ball valve assembly including a pair of flanged connecting members interconnected by bolts, and a tubular valve body positioned radially inside the bolts ad containing a valve ball. Seal rings are disposed radially inside the bolts between two opposed end faces of the valve body and the respective flanged connecting members. Each seal ring includes a sealing element mating with, and sealingly engaging, the ball, and an axial flange extending axially along, and engaging a portion of, the internal wall of the tubular valve body to thereby maintain the radially outer portion of the seal rings in position between the connecting members and the end faces of the valve body.

---

This invention relates generally to improved ball valve structures. More particularly, but not by way of limitation, this invention relates to an improved ball valve for use between a pair of flanged connecting members.

Previously constructed ball valves for use between flanged connecting members have generally included a valve body having a passageway extending therethrough, a valve ball or closure member located in the passageway that is movable from open to a closed position, and a pair of seal or seat members positioned in counterbores in the valve body. The seal members encircle the passageway and extend into sealing engagement with the valve closure member. The flanged connecting members generally engage the seat members to hold the seat members, valve body, and valve closure member assembled. A plurality of threaded fasteners extend between the flanges of the flanged connecting members maintaining the ball valve assembled.

When the threaded fasteners are tightened, moving the flanged connecting members relatively together to hold the ball valve assembled, a severe compressive force is placed on the valve body and the seal members. Often, the compressive force is sufficiently great to distort the valve body or seal members, resulting in leakage from the valve body or binding of the valve closure member. To prevent such distortion, the common practice has been to increase the wall thickness of the valve body and the thickness of the seal members.

Increasing the thickness of each of the seal members or of the wall of the valve body reduces the clearance within the valve, thus limiting the size of the valve closure member and, consequently, the size of the flow port that can be formed in the valve closure member.

This invention generally provides an improved ball valve for use between a pair of flanged connecting members wherein each of connecting members has an end face adjacent the valve. The improved valve includes: a valve body having first and second end faces and a passageway extending through the body intersecting the end faces; a valve ball having a flow port extending therethrough disposed in the passageway and rotatable therein from an open position to a closed position; operating means extending through the valve body into engagement with the valve ball for rotating the valve ball; and, a seal ring disposed adjacent the first end face on the valve body. The seal ring includes an end face adapted to engage the end face on the adjacent connecting member, an outer periphery, a shoulder on the outer periphery in engagement with the first end face on the valve body, an axial flange adjacent the shoulder and disposed in the passageway in engagement with the valve body and means on the seal ring sealingly engaging the valve ball.

One object of the invention is to provide an improved ball valve used between a pair of flanged connecting members arranged to eliminate distorting forces exerted on the valve during assembly.

Another object of the invention is to provide an improved ball valve for use between a pair of flanged connecting members that has the maximum flow area therethrough.

A further object of the invention is to provide an improved ball valve for use between a pair of flanged connecting members that effectively minimizes distorting forces during assembly of the valve and that provides the maximum flow area therethrough.

Still another object of the invention is to provide an improved ball valve for use between a pair of flanged connecting members that can be quickly, easily and economically manufactured.

The foregoing and additional objects and advantages of the invention will become more apparent as the following detailed description is read in conjunction with the accompanying drawings wherein like reference characters denote like parts in all views and wherein.

EMBODIMENT OF FIG. 1

Figures 1, 2:
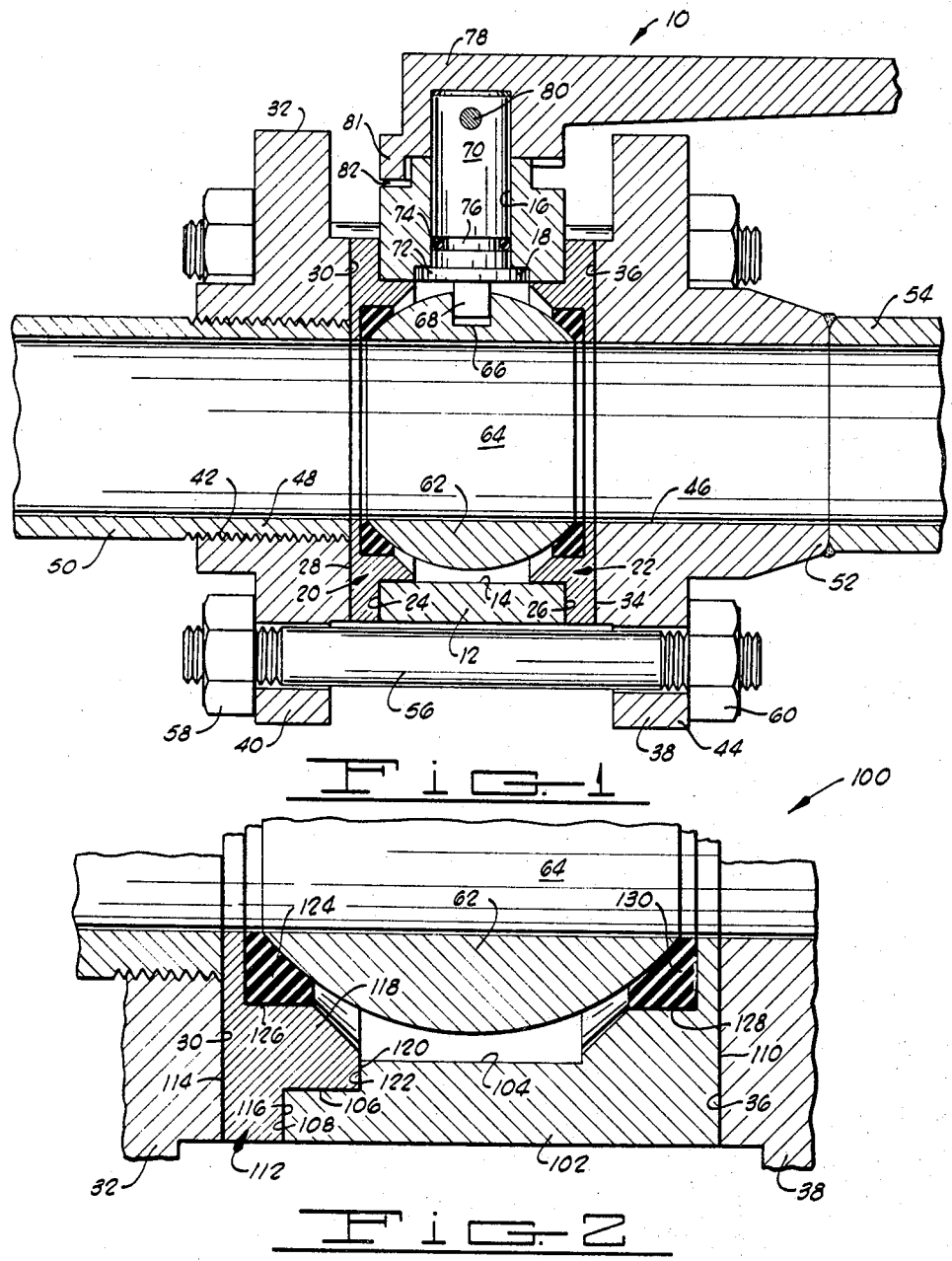
FIG. 1 is a vertical cross-sectional view of a ball valve constructed in accordance with the invention.
FIG. 2 is an enlarged fragmentary cross-sectional view of another embodiment of ball valve also constructed in accordance with the invention.

Referring to the drawings and to FIG. 1 in particular, shown therein and generally designated by the reference character 10 is a ball valve constructed in accordance with the invention. As illustrated therein, the ball valve 10 includes a valve body 12 having a passageway 14 extending therethrough. A transverse passageway 16 extends through the wall of the valve body 12 intersecting the passageway 14 for purposes that will be described more fully hereinafter. The transverse opening 16 is provided with a counerbore adjacent its intersection with the passageway 14 providing a planar surface 18 in the valve body 12.

A pair of seal rings 20 and 22 that are identical in construction though oppositely disposed in the ball valve 10 are illustrated as being in engagement with an end face 24 and an end face 26, respectively, on the valve body 12. The seal ring 20 includes an end face 28 that is in engagement with an end face 30 on a flanged connecting member 32. The seal ring 22 includes an end face 34 that is in engagement with an end face 36 on a flanged connecting member 38. The seal rings 20 and 22 are preferably constructed from a relatively rigid material.

The flanged connecting member 32 includes an exterior flange 40 and a threaded opening 42 extending therethrough in alignment with the passageway 14 of the valve body 12. The flanged connecting member 38 includes an exterior flange 44 and an opening 46 extending therethrough in alignment with the passageway 14 in the valve body 12.

As can be perceived from viewing FIG. 1, the flanged connecting member 32 is illustrated as being of the threaded fitting type, that is, the threaded opening 42 extending therethrough is adapted to receive the threaded end 48 of a conduit 50. The flanged connecting member 38 is illustrated as being of the weld type, that is, an end 52 of the flanged connecting member 38 is arranged to be welded to a conduit 54. It should be understood that the flanged connecting members 32 and 38 may be identically constructed if desired.

A plurality of threaded fasteners 56 extend through the flanges 40 and 44 of the connecting members 32 and 38, respectively, and are provided with threaded nuts 58 and 60 that are threaded onto the threaded fasteners 56 to move the flanged connecting members 32 and 38 relatively toward each other.

Located within the passageway 14 in the valve body 12 is a valve ball 62 having a flow port 64 extending therethrough. The exterior surface of the valve ball 62 is provided with a rectangular recess 66 sized to receive the rectangular end 68 of a valve operating member 70.

The valve operating member 70 extends through the transverse opening 16 and includes an exterior flange 72 that is in engagement with the surface 18 of the valve body 12, thereby limiting the upward movement of the valve operating member 70 in the valve body 12. An O-ring seal 74 is located in an annular groove 76 encircling the valve operating member 70. The seal 74 sealingly engages both the valve operating member 70 and the valve body 12 in the transverse opening 16.

The end of the valve operating member 70 extending from the valve body 12 is connected with a valve operating handle 78 by a pin 80. Preferably, the operating handle 78 is provided with one or more lugs 81 that are engageable with abutments 82 formed on the exterior of the valve body 12 to limit the rotational movement of the operating handle 78, valve operating member 70 and valve ball 62 to approximately 90 degrees.

Figure 1A:
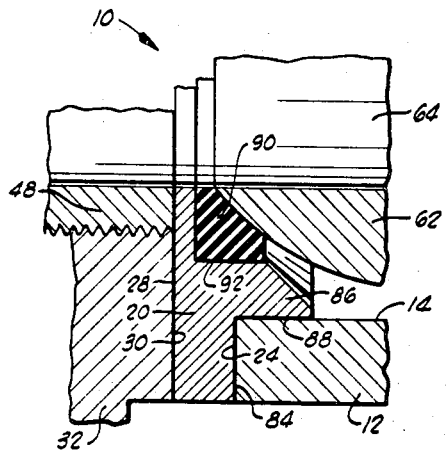
FIG. 1A is an enlarged fragmentary cross-sectional view of a portion of the ball valve of FIG. 1.

As shown most clearly in FIG. 1A, the seal ring 20 is provided with an annular shoulder 84 on the outer periphery thereof that fully engages the end face 24 on the valve body 12. An axial flange 86 projects from the seal ring 20 into the passageway 14 and has an outside diameter forming a surface 88 thereon that engages the valve body 12 in the passageway 14.

A resilient annular seal member 90 is disposed in an annular groove 92 formed in the seal ring 20. The seal member 90 sealingly engages the exterior surface of the valve ball 62.

As may be clearly seen in FIG. 1A, the end face 30 of the flanged connecting member 32 fully engages the end face 28 on the seal ring 20 and the shoulder 84 on the seal ring 20 fully engages the end face 24 of the valve body 12. This arrangement provides for the transmission of the force exerted by the threaded fasteners to the valve body 12 as a pure compressional load, thus eliminating any bending moment or distorting forces that tend to deform the valve body 12 and/or the seal rings 20 and 22.

As a result of the pure compression loading of the valve 10, the valve body 12 and the seal rings 20 and 22 may be reduced in thickness so that the valve ball 62 can be constructed of maximum diameter. Manifestly, with the maximum diameter valve ball 62 located in the passageway 14, the flow port 64 extending therethrough can also be increased to the maximum size to provide an optimum flow area through the valve 10.

EMBODIMENT OF FIG. 2

FIG. 2 illustrates another embodiment of ball valve generally designated by the reference character 100 and also constructed in accordance with the invention. As illustrated therein, the valve 100 includes a valve body 102 having a passageway 104 extending therethrough.

The valve body 102 includes a counterbore 106 formed adjacent an end face 108 thereon. A second end face 110 is illustrated as being in engagement with the end face 36 of the flanged connecting member 38.

The valve 100 also includes the valve ball 62 having the flow port 64 therein. The valve ball 62 is positioned in the passageway 104 for rotation between open and closed positions as previously described.

A seal ring 112 is disposed between the end face 108 of the valve body 102 and the end face 30 of the connecting member 32. More specifically, the seal ring 112 includes an end face 114 engaging the end face 30 of the connecting member 32.

The seal ring 112 also includes a shoulder 116 that fully engages the end face 108 of the valve body 102. An axial flange 118 extends from the seal ring 112 into the counterbore 106 of the valve body 102. The axial flange 118 has an outside diameter sized to engage the valve body 102 in the counterbore 106. Also, an end face 120 on the axial flange 118 engages a shoulder 122 formed by the counterbore 106 in the valve body 102. An annular resilient seal member 124 is located in an annular recess 126 in the seal ring 112 and has a surface thereon sealingly engaging the exterior surface of the valve ball 62.

The valve body 102, adjacent the end face 110, is constructed to approximate the configuration of the seal ring 112. As shown in FIG. 2, an annular groove 128 formed in the valve body 102 carries an annular resilient seal member 130. The seal member has a surface thereon sealingly engaging the exterior surface of the valve ball 62.

When assembling the ball valve 100, the valve ball 62 is inserted in the passageway 104 of the valve body 102 and the sealing ring 112 is then inserted therein with the axial flange 118 located in the counterbore 106. The valve body 102 and seal ring 112 are placed between the flanges 32 and 38 and the nuts 58 and 60 (see FIG. 1) are tightened to move the flanged connecting members 32 and 38 relatively together. When this occurs, it can be seen that the end face 108 of the valve body 102 and the shoulder 122 therein engage the end 120 and the shoulder 116 on the seal ring 112. Thus, the force exerted by tightening the threaded fasteners 56 is absorbed in the valve 100 as a compressive force effectively eliminating distortion in the valve body 102 or seal ring 112. With distorting forces eliminated, the thickness of the valve body 102 (that is the wall thickness thereof), and the thickness of the seal ring 112 can be reduced to the minimum thickness required to withstand fluid pressure within the valve 100, permitting the valve ball 62 to be constructed of a maximum diameter. Again, when the valve ball 62 is of the maximum diameter, the flow port 64 therein may also be constructed of the maximum diameter thereby providing the optimum flow area through the valve 100.

EMBODIMENT OF FIG. 3

Figure 3:
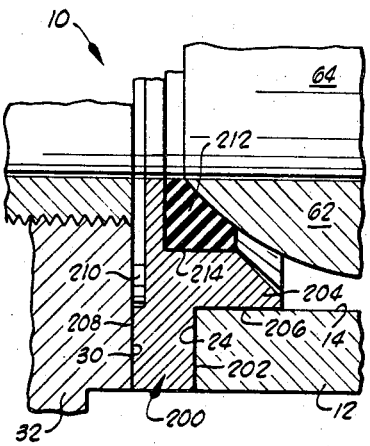
FIG. 3 is an enlarged fragmentary cross-sectional view similar to FIG. 1A, but illustrating still another embodiment of ball valve constructed in accordance with the invention.

FIG. 3 illustrates a modification of the seal rings utilized in the ball valve 10. As shown therein, a seal ring 200 has a shoulder 202 fully engaging the end face 24 of the valve body 12. An axial flange 204 projects from the seal ring 200 into the passageway 14 of the valve body 12 and has an outside diameter sized so that a peripheral surface 206 on the axial flange 204 engages the valve body 12 in the passageway 14.

An end face 208 of the seal ring 200 engages the end face 30 of the flanged connecting member 32. A counterbore 210 is provided in the end face 208 so that the surface area of the end face 208 engaging the end face 30 is equal to but not less than the area of the end face 24 engaging the shoulder 202 of the seal ring 200 and in direct alignment therewith. The counterbore 210 insures that the force transmitted from the end face 30 to the seal ring 200 and to the end face 24 of the valve body 12 will be a compressive force thereby eliminating distorting forces from the valve body 12 and seal ring 200. With the elimination of the distorting forces, the valve ball 62 and flow port 64 therein can be constructed of maximum size to provide an optimum flow area in the valve 10 as previously described.

A resilient annular seal member 212 is disposed in an annular recess 214 provided in the seal ring 200. The seal member 212 has a surface thereon sealingly engaging the exterior surface of the valve ball 62.

It should be evident from the foregoing description of FIGS. 1 and 2 that the valve 10 or the valve 100 may be provided with seal rings configured as shown in FIG. 3 on each end thereof as illustrated in FIG. 1 or on a single end thereof as illustrated in FIG. 2.

EMBODIMENT OF FIG. 4

Figure 4:
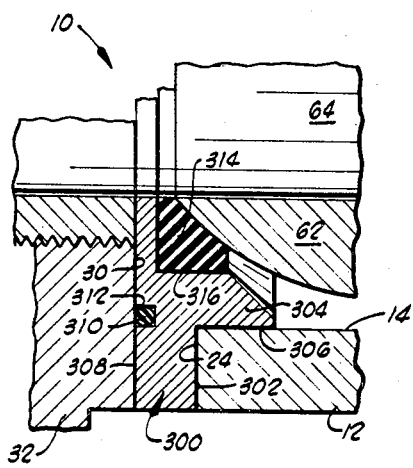
FIG. 4 is an enlarged fragmentary cross-sectional view similar to FIG. 3, but illustrating an additional embodiment of ball valve also constructed in accordance with the invention; and, FIG. 5 is an enlarged fragmentary cross-sectional view similar to FIG. 4, but illustrating still another embodiment of ball valve also constructed in accordance with the invention.

The fragmentary cross-sectional view of FIG. 4 illustrates another embodiment of seal ring generally designated by the reference character 300. The seal ring 300 includes a shoulder 302 thereon tha tfully engages the end face 24 of the valve body 12. An axial flange 304 projects from the seal ring 300 into the passageway 14. The outside diameter of the axial flange 304 is sized so that a surface 306 thereon engages the valve body 12 in the passageway 14. An end face 308 on the seal ring 300 is in engagement with the end face 30 of the flanged connecting member 32.

An O-ring seal 310 is located in an annular groove 312 in the end face 308 of seal ring 300. The O-ring seal 310 is in sealing engagement with the end face 30 and with the seal ring 300 to prevent the escape of fluid from the interior of the valve 10. It is important to note that the annular groove 312 has an outside diameter that does not exceed the diameter of the passageway 14.

Therefore, the force exerted, when the threaded fasteners 56 (see FIG. 1) are tightened, is transmitted through the end face 30 of the flanged connecting member 32 to the end face 308 of the seal ring 300, through the shoulder 302 thereon to the end face 24 of the valve body 12 as a direct compressive load. Thus, forces tending to deform the seal ring 300 are eliminated from the valve.

Since the force exerted on the valve body 12 is a direct compressive load, the wall thickness thereof can be substantially reduced, permitting the location of a maximum diameter ball 62 in the passageway 14. As previously described, the flow port 64 through the valve ball 62 may be enlarged so that it provides the optimum flow passageway therethrough.

A resilient annular seal member 314 is located in an annular groove 316 formed in the seal ring 300. The seal member 314 has a surface thereon sealingly engaging the exterior surface of the valve ball 62.

EMBODIMENT OF FIG. 5

Figure 5:
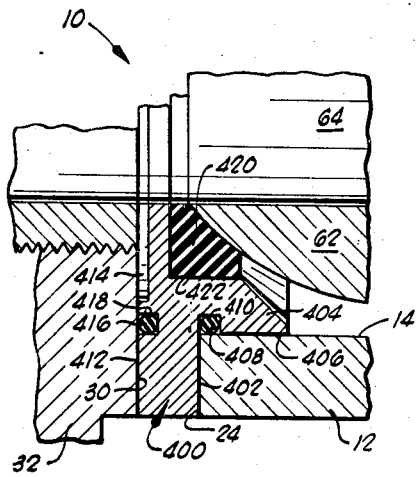

FIG. 5 illustrates another embodiment of seal ring that can be utilized in the valve ball 10. The seal ring illustrated therein is generally designated by the reference character 400 and is also constructed in accordance with the invention.

A shoulder 402 on the seal ring 400 is in engagement with the end face 24 of the valve body 12 and an axial flange 404 projects from the seal ring 400 into the passageway 14 of the valve body 12. The axial flange 404 has an outside diameter sized so that the surface 406 thereon is in engagement with the valve body 12 in the passageway 14.

An O-ring seal 408 is located in an annular groove 410 formed in the axial flange 404 adjacent the shoulder 402. As illustrated in FIG. 5, the O-ring 408 is in sealing engagement with the valve body 12 in the passageway 14 and with the seal ring 400.

An end face 412 on the seal ring 400 is in engagement with the end face 30 of the flanged connecting member 32. A counterbore 414 is provided in the end face 412 thereby reducing the area of the end face 412 in engagement with the end face 30. An O-ring seal 416 is located in an annular groove 418 that encircles the counterbore 414. It is to be noted that the outside diameter of the annular groove 418 does not exceed the diameter of the passageway 14 and that the O-ring 416 sealingly engages the end face 30 of the flanged connecting member 32 and the seal ring 400.

From the foregoing, it can be appreciated that the compressive load exerted by the tightening of the threaded fasteners 56 (see FIG. 1) is absorbed in the valve 10 (having the seal ring 400 located therein) as a direct compressive load. The compressive load is carried by the end face 412 of the seal ring 400, the end face 24 of the valve body 12 and the shoulder 402 of the seal ring 400.

Thus, and as previously mentioned with respect to the other embodiments of seal ring, the wall thickness of the valve body 12 can be reduced to permit the location of a valve ball 62 of maximum diameter therein. Also as previously mentioned, the flow port 64 through the valve ball 62 can be constructed of maximum diameter, thereby providing an optimum flow area through the valve 10.

An annular resilient seal member 420 is located in an annular groove 422 in the seal ring 400. The seal member 420 has a surface thereon sealingly engaging the exterior surface of the valve ball 62.

From the foregoing detailed descriptions of the various embodiments of valves and seal rings constructed in accordance with the invention, it should be apparent that each of the embodiments provides a structure that transmits the load imposed, upon assembly of the valve, through the valve body as a pure compressive load. The structures described effectively eliminate distorting forces from the valve body and, thereby, permit the reduction of the wall thickness of the valves so that a valve ball having a flow port therein of optimum size can be utilized. Furthermore, valves constructed in accordance with the invention are lighter in weight and less expensive than comparable size valves presently being manufactured.

It should be understood that the embodiments presented herein are by way of example only and that many changes and modifications can be made thereto without departing from the spirit of the invention or from the scope of the annexed claims.

What I claim is:
1. A ball valve comprising:
  a valve body having first and second end faces and a passageway extending through said body and end faces;
  a valve ball having a port extending therethrough, said valve ball being disposed in said passageway and rotatable therein from an open position, wherein said port is aligned with said passageway, to a closed position, wherein said port is disposed at substantially a right angle to said passageway;
  operating means extending through said valve body into engagement with said valve ball for rotating said valve ball;
  a first flanged connecting member having an end face and having an opening extending therethrough aligned with said passageway, the end face of said first flanged connecting member having a transverse dimension not exceeding the transverse dimension of the end faces of said valve body, and said first flanged connecting member having a flange extending radially outwardly with respect to said valve body;
  a second flanged connecting member having an end face and an opening extending therethrough aligned with said passageway, the end face of said second flanged connecting member having a transverse dimension not exceeding the transverse dimension of the end faces of said valve body and having a flange extending radially outwardly with respect to the valve body;

a seal ring disposed between the first end face on said valve body and said end face on said second flanged connecting member, said seal ring including an end face engaging the end face on said second flanged connecting member, a shoulder on the outer periphery engaging the first end face on said valve body, and an axial flange extending into said passageway and having an outer diameter sized to engage said valve body in said passageway;

means on said seal ring sealingly engaging said valve ball; and connecting means extending between the flanges on said flanged connecting members and lying entirely outside of said valve body and said seal ring, said connecting means being tensioned to exert a force on the flanges of said connecting members holding said members, valve body and said seal ring assembled, said force being absorbed in compression by the engagement between said shoulder of the seal ring and the first end face on said valve body, and by the engagement between the end face of said seal ring with the end face of said second connecting member.

2. A ball valve as defined in claim 1 and further characterized to include:

a second seal ring disposed between the second end face on said valve body and the end face on said first flanged connecting member, said second seal ring being positioned radially inwardly of said connecting means and including an end face engaging the end face of said first flanged connecting member, a shoulder on the outer periphery of the ring engaging the second end face on said valve body, and an axial flange extending into said passageway and having an outer diameter sized to engage said valve body in said passageway; and means on said second seal ring sealingly engaging said valve ball.

3. The valve of claim 2 and also including a counterbore in the end faces of each of said seal rings, said counterbore having an outer diameter not greater than the diameter of said passageway.

4. The valve of claim 2 and also including:

a first resilient annular seal disposed in an annular groove in each of the end faces on said seal rings, said annular grooves having an outer diameter not greater than the diameter of said passageway;

a second resilient annular seal disposed in a groove in the axial flanges of each of said seal rings, said grooves being located adjacent said shoulders; and, wherein said means sealingly engaging said valve ball on each of said seal rings includes a third resilient annular seal carried by said seal rings.

5. The ball valve of claim 2 wherein said connecting means includes a plurality of threaded members extending between the flanges on said connecting members on the exterior of said valve body, said threaded members including threaded means thereon engaging said flanges for exerting a force on said flanges tending to move said connecting members relatively together.

References Cited

UNITED STATES PATENTS

| | | | |
|---|---|---|---|
| 2,895,496 | 7/1959 | Sanctuary | 251—317 |
| 2,989,990 | 6/1961 | Bass | 251—172 |
| 3,033,227 | 5/1962 | Goldman | 251—148 |
| 3,157,380 | 11/1964 | Sivyer | 251—315 |

FOREIGN PATENTS 1,376,015  9/1964  France.

M. CARY NELSON, *Primary Examiner.*

W. R. CLINE, *Assistant Examiner.*